United States Patent
Jain et al.

(10) Patent No.: US 9,548,066 B2
(45) Date of Patent: Jan. 17, 2017

(54) VOICE APPLICATION ARCHITECTURE

(71) Applicant: Amazon Technologies, Inc., Seattle, WA (US)

(72) Inventors: Vikas Jain, Bellevue, WA (US); Rohan Mutagi, Redmond, WA (US); Peter Paul Henri Carbon, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/456,620

(22) Filed: Aug. 11, 2014

(65) Prior Publication Data
US 2016/0042748 A1 Feb. 11, 2016

(51) Int. Cl.
| G06F 17/27 | (2006.01) |
| G10L 25/48 | (2013.01) |
| G10L 15/22 | (2006.01) |
| G06F 17/28 | (2006.01) |
| G10L 15/30 | (2013.01) |
| G10L 15/26 | (2006.01) |
| G10L 15/18 | (2013.01) |

(52) U.S. Cl.
CPC ........... *G10L 25/48* (2013.01); *G06F 17/2785* (2013.01); *G06F 17/28* (2013.01); *G10L 15/22* (2013.01); *G10L 15/30* (2013.01); *G06F 17/274* (2013.01); *G10L 15/1822* (2013.01); *G10L 15/265* (2013.01); *G10L 2015/223* (2013.01)

(58) Field of Classification Search
CPC G06F 17/2785; G06F 17/2755; G06F 17/271; G06F 17/274; G06F 17/277; G10L 15/22; G10L 15/30; G10L 15/07; G10L 15/08; G10L 15/20; G10L 15/265; G10L 15/063; G10L 15/183; G10L 15/193; G10L 15/19; G10L 17/26
USPC ......... 709/9; 704/9, 231, 251, 257, 270, 275
See application file for complete search history.

(56) References Cited

U.S. PATENT DOCUMENTS

| 7,418,392 B1 | 8/2008 | Mozer et al. |
| 7,720,683 B1 | 5/2010 | Vermeulen et al. |
| 7,774,204 B2 | 8/2010 | Mozer et al. |

(Continued)

FOREIGN PATENT DOCUMENTS

WO WO2011088053 A2 7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

(Continued)

*Primary Examiner* — Vu B Hang
(74) *Attorney, Agent, or Firm* — Lee & Hayes, PLLC

(57) ABSTRACT

A voice-based system may comprise a local speech interface device and a remote control service. A user may interact with the system using speech to obtain services and perform functions. The system may allow a user to install applications to provide enhanced or customized functionality. Such applications may be installed on either the speech interface device or the control service. The control service receives user speech and determines user intent based on the speech. If an application installed on the control service can respond to the intent, that application is called. Otherwise, the intent is provided to the speech interface device which responds by invoking one of its applications to respond to the intent.

25 Claims, 6 Drawing Sheets

(56) References Cited

U.S. PATENT DOCUMENTS

| | | |
|---|---|---|
| 8,515,766 B1 | 8/2013 | Bringert et al. |
| 2009/0150156 A1 | 6/2009 | Kennewick et al. |
| 2010/0217604 A1* | 8/2010 | Baldwin ................ G06Q 30/02 |
| | | 704/275 |
| 2012/0223885 A1 | 9/2012 | Perez |
| 2012/0253790 A1* | 10/2012 | Heck ................. G06F 17/30867 |
| | | 704/9 |
| 2014/0222422 A1 | 8/2014 | Sarikaya et al. |
| 2014/0365209 A1* | 12/2014 | Evermann ............ G06F 17/279 |
| | | 704/9 |
| 2015/0142447 A1* | 5/2015 | Kennewick ......... G10L 15/1822 |
| | | 704/275 |

OTHER PUBLICATIONS

PCT Search Report and Written Opinion mailed Oct. 12, 2015 for PCT Application No. PCT/US15/41186, 10 pages.

\* cited by examiner

VOICE APPLICATION ARCHITECTURE

BACKGROUND

Homes and other user premises are increasingly equipped with always-on Internet or "cloud" connectivity. In many cases, even mobile users have constant or nearly constant data connectivity. The common availability of network communications, in combination with increasing capabilities of computing devices, has created a number of new possibilities for services and other functionality that use the variety of connected devices accessible to users. Language-based and speech-based systems are examples of technologies that may be used to provide conveniences to users as they interact with automated systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure describes devices, systems, and services that perform natural language and/or speech-based interactions with users. In described embodiments, a system listens to or interacts with a user to determine a user intent based on natural language understanding of the user's speech. For example, a user may utter an expression that is understood as an intent to play a song or to order movie tickets. In certain embodiments, the system may conduct natural language dialogs with the user to determine or clarify user intents. Upon determining the intent of the user, the system acts upon the intent by performing an action or providing a service in fulfillment of the intent, such as by playing the song or interacting further with the user to order movie tickets.

The system may include a speech interface device located in the home of a user and a supporting cloud-based control service. The speech interface device is configured to capture user utterances and provide them to the control service. The control service performs speech recognition and natural language understanding on the utterances to determine intents expressed by the utterances. In response to an identified intent, the control service causes a corresponding action to be performed. An action may be performed at the control service or by instructing the speech interface to perform a function.

Built-in capabilities of the system may be extended by aftermarket applications that are selected or purchased by a user. Such applications may be designed for installation and execution on either the control service or the speech interface device. Upon determining a user intent based on received user speech, the control service identifies one of the applications that is suitable for responding to the intent. If such an application has been installed and enabled on the control service, the control service invokes that application. Otherwise, if there is a suitable application installed on the speech interface device, the control service passes an indication of the user intent to the speech interface device. Upon receiving an indication of an intent, the speech interface device invokes a corresponding application to respond to the user intent.

Figure 1:
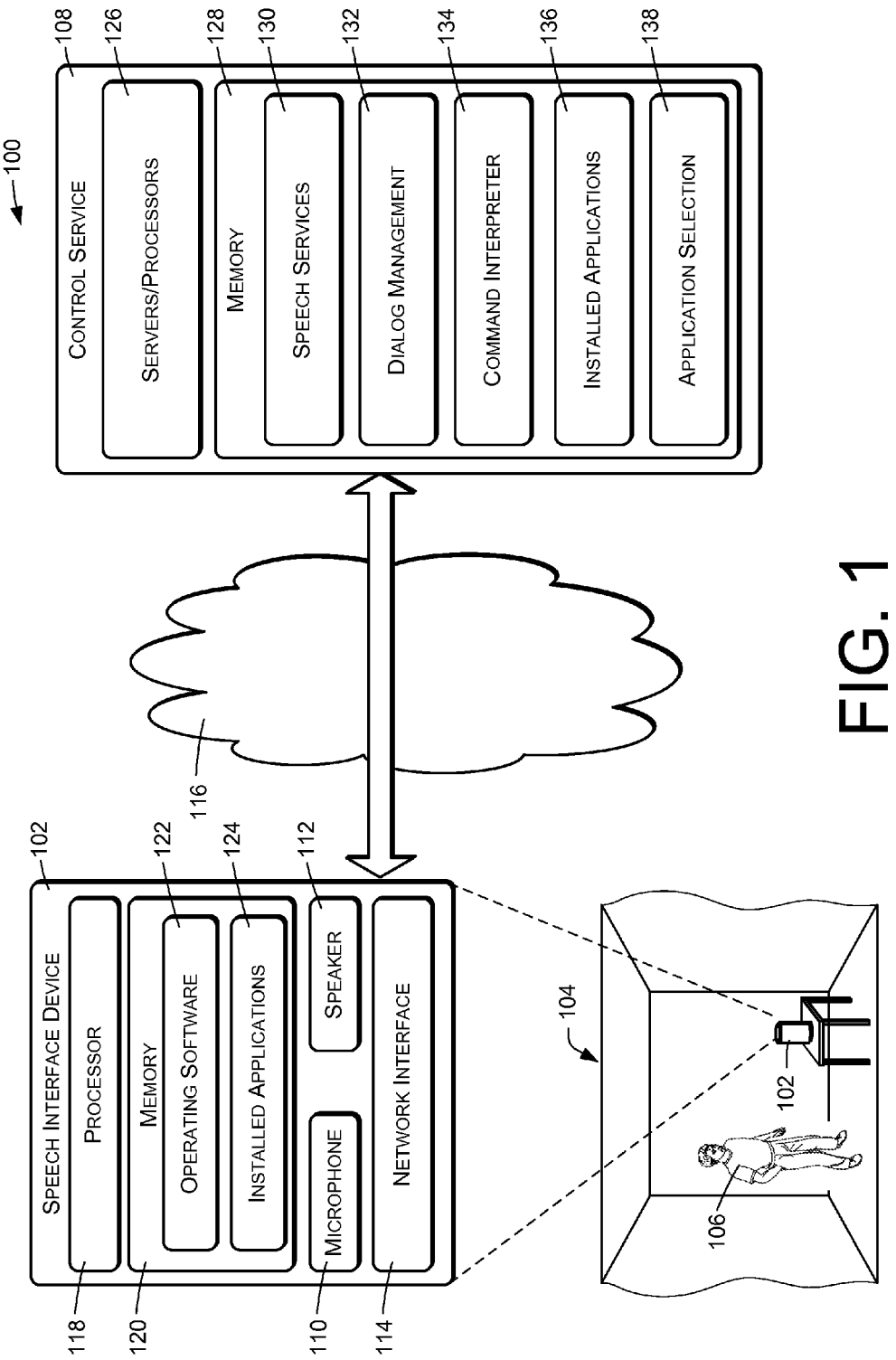
FIG. 1 is a block diagram illustrating a speech-based system having a control service and a speech interface device.

FIG. 1 shows an example of a voice-based platform or system 100 such as may be used to implement these techniques. The system 100 may include or may utilize a speech interface device 102 that is capable of capturing and playing audio. The speech interface device 102 may be local to and/or located within an environment 104 such as a home or other premises to provide services for a user 106. The speech interface device may be alternatively referred to herein as a speech interface, as an interface device, or simply as a device. In different embodiments, the functions of the speech interface device may be performed by different types of devices including mobile devices such as smartphones, tablet computers, media players, personal computers, etc.

The speech interface device 102 may operate in conjunction with and/or under the control of a remote, network-based or network-accessible control service 108, also referred to as a speech service or speech-based service, that is configured to receive audio from the speech interface device 102, to recognize speech in the received audio, and to perform or initiate functions or services in response to the recognized speech. Such functions or services may be implemented by the control service 108 independently of the speech interface device 102, and/or may be implemented by providing a command to the speech interface device 102 for local execution by the speech interface device 102. For example, the control service 108 may instruct the speech interface device 102 to play music, speech, or other audio content specified by the control service 108. Additionally, functions or services may be implemented by applications that are enabled and/or installed by the user for execution on the speech interface device 102 or the control service 108.

The speech interface device 102 may have one or more microphones 110 and one or more audio speakers or transducers 112 to facilitate speech interactions with the user 106. The speech interface device 102 may have a network communications interface 114 for communications over a communications network 116 with the control service 108. The communications network 116 may comprise a public, wide-area network such as the Internet or may comprise any of various other types of public and private networks that extend beyond the local premises of the user 106. Additionally, the communications interface 114 may communicate locally over a local-area network within the user premises.

The speech interface device 102 may include operational or control logic, which may comprise a processor 118 and memory 120. The processor 118 may include multiple processors and/or a processor having multiple cores. The processor 118 may also comprise or include a digital signal processor for processing audio signals.

The control logic may include applications, programs and other software stored in the memory 120. The software may comprise computer-executable instructions that are executed by the processor 118 to perform acts or actions that implement desired functionality of the speech interface device 102, including the functionality described herein. The memory 120 may be a type of non-transitory computer-readable storage media and may include volatile and non-volatile memory. Thus, the memory 120 may include, but is not limited to, RAM, ROM, EEPROM, flash memory, magnetic media, optical media, or other memory technology. The memory 120 may also include media commonly used for transferring or distributing software, such as CD-ROMs, DVDs, flash drives, memory sticks, etc.

The software may include system or operating software 122 that is preinstalled on and integrated with the speech interface device 102. The operating software 122 may comprise an operating system that provides basic functionality of the speech interface device 102, including drivers, audio processing functions, interfaces to the control service 108, and so forth. The operating software 122 may include preinstalled programs or applications for performing various "built-in" functions and actions. The operating software 122 may also include action handlers or interfaces that perform actions in response to instructions received from the control service 108.

The memory may 120 may also contain user-installed applications 124, also referred to herein as device applications, which may comprise applications that have been installed by the user 106 in the memory 120 and activated for execution by the processor 118 subsequent to purchase and installation of the device 102. Various aftermarket applications may be available to the user for local installation and execution. In some embodiments, the control service 108 may provide functionality for allowing the user to identify and install applications that have been made available by various developers and vendors for execution on the speech interface device 102. For example, the user may state "Find an application for calling a taxi." The control service 108 may respond by offering to provide such an application for installation on the speech interface device 102. The user may accept the offer, whereupon the application may be provided to and installed on the speech interface device 102.

The control service 108 may in some instances be part of a network-accessible computing platform that is maintained and accessible via the network 116. Network-accessible computing platforms such as this may be referred to using terms such as "on-demand computing", "software as a service (SaaS)", "platform computing", "network-accessible platform", "cloud services", "data centers", and so forth. The control service 108 may be configured to provide services to large numbers of speech interface devices 102 in the homes or premises of different users.

The speech interface device 102 and/or the control service 108 may communicatively couple to the network 116 via wired technologies (e.g., wires, universal serial bus (USB), fiber optic cable, etc.), wireless technologies (e.g., radio frequencies (RF), cellular, mobile telephone networks, satellite, Bluetooth, etc.), or other connection technologies. The network 116 is representative of any type of communication network, including data and/or voice networks, and may be implemented using wired infrastructure (e.g., coaxial cable, fiber optic cable, etc.), a wireless infrastructure (e.g., RF, cellular, microwave, satellite, Bluetooth®, etc.), and/or other connection technologies.

The control service 108 is configured to receive an audio stream from the speech interface device 102, to recognize speech in the audio stream, and to determine user intent from the recognized speech. Depending on the nature of the recognized intent, the control service 108 may respond by performing an action or invoking an application to perform an action.

In some cases, the control service 108 may determine the intent and return a description of the intent to the speech interface device 102 so that the speech interface device 102 can perform an action in response to the intent. Upon receiving a recognized intent from the control service 108, the speech interface device may invoke one of the user-installed applications 124 to perform an action in fulfillment of the intent.

In other cases, the control service may return an instruction or command to the speech interface device 102 and a command handler of the speech interface device 102 may execute the instruction or command to perform an action within the environment 104.

The control service 108 includes operational or control logic, which may comprise one or more servers, computers, and/or processors 126. The control logic includes memory 128 containing applications, programs, and/or other software in the form of instructions that are executed by the processor 126 to perform acts or actions that implement desired functionality of the control service 108, including the functionality described herein. The memory 128 may be a type of non-transitory computer-readable storage media and may include volatile and nonvolatile memory. Thus, the memory 128 may include, but is not limited to, RAM, ROM, EEPROM, flash memory, magnetic media, optical media, or other memory technology. The memory 128 may also include media commonly used for transferring or distributing software, such as CD-ROMs, DVDs, flash drives, memory sticks, etc.

Among other logical and physical components not specifically shown, software of the control service 108 may include a speech processing component 130, also referred to as speech services 130. The speech services 130 may include automatic speech recognition (ASR) functionality that recognizes human speech in an audio signal provided by the speech interface device 102 from the microphone 110. The speech services 130 may also include natural language understanding (NLU) functionality that determines user intent based on user speech that is recognized by the speech recognition components. The speech services 130 may also include speech generation functionality that synthesizes or otherwise produces speech audio. For example, the speech generation functionality may comprise a text-to-speech component that produces speech to be played on the speaker 112 of the speech interface device 102.

The control service 108 may also provide a dialog management component 132 configured to coordinate speech dialogs or interactions with the user 106 in conjunction with the speech services 130. Speech dialogs may be used to determine or clarify user intents by asking the user for information using speech prompts.

The control service 108 may also comprise a command interpreter and action dispatcher 134 (referred to below simply as a command interpreter 134) that determines functions or commands corresponding to intents expressed by user speech. In some cases, commands may correspond to functions that are to be performed at least in part by the speech interface device 102, and the command interpreter 134 may in those cases provide device commands or instructions to the speech interface device 102 for implementing such functions. The command interpreter 134 implements basic, "built-in" capabilities that are used in conjunction with the speech interface device 102. Such basic capabilities may be implemented and enabled by default for users of all speech interface devices 102. Examples of basic capabilities may comprise setting alarms or notifications, increasing/decreasing the volume of the speaker 112, generating audible speech through the speaker 112, initiating certain types of communications with users of similar devices, and so forth.

The control service 108 may also have or be configured to use one or more user-installed applications 136, which may also be described as aftermarket applications, third-party applications, optional applications, enabled applications, server applications, and so forth. Applications such as this may be optional and may be obtained by the user 106 from a library or other collection of available installable applications. In some cases, a user may purchase applications for use in conjunction with the system 100. Generally, server applications may be selected, obtained, and installed by a user in the same manner as the device applications 124.

The user-installed applications 136 provide supplemental and/or additional functionality and capabilities, in addition to the basic functionality provided by the command interpreter 134. Enabled or authorized user-installed application 136 applications may be automatically invoked in response to recognized user intents that the applications are capable of servicing.

In certain situations, the user-installed server applications 136 may be provided and hosted by the control service 108. Alternatively, certain of the server applications 136 may be provided and/or hosted by third parties or third-party services, and may communicate with the control service 108 using network-based interfaces.

The control service 108 may also have an application selection component 138, also referred to herein as an intent router 138, that selects and invokes applications based on recognized intents expressed by user speech. For example, each of the server applications 136 may be associated with one or more intents to which the application is capable of responding. In response to a recognized user intent that is not serviceable by the command interpreter 134, the application selector 138 may select and invoke one of the server applications 136 of the control service 108. In some cases, the application selector 138 may also select from the installed device applications 124 of the speech interface device.

The control service 108 may also perform functions, in response to speech recognized from received audio, that involve entities or devices that are not shown in FIG. 1. For example, the control service 108 may interact with other network-based services to obtain information or services on behalf of the user 106.

Figure 2:
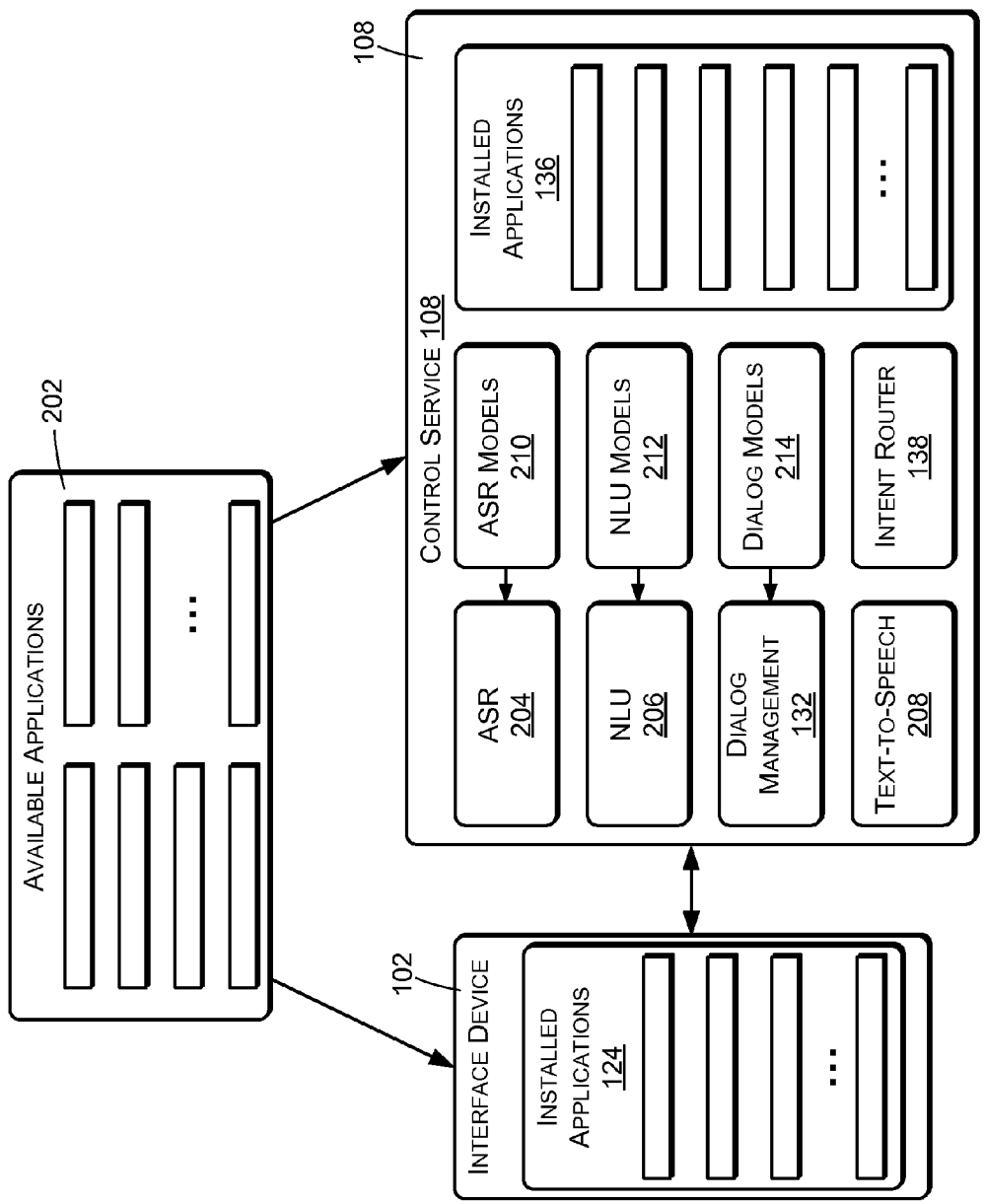
FIG. 2 is a block diagram illustrating the use and installation of applications on the control service and the speech interface device.

FIG. 2 illustrates an example of how installable speech-based applications may be obtained and used in certain embodiments. As described above, the speech interface device 102 may have multiple user-installed device applications 124 and the control service 108 may also have multiple user-installed server applications 136. The installed applications 124 and 136 may be obtained from a collection of available installable applications 202 and installed in response to user requests. The available applications 202 may comprise applications that are optional and that supplement functionality provided by the system 100 or that add additional functionality. The available applications 202 may be provided by the operator of the control service 108 or may be designed and provided by third-party entities.

Certain of the available applications 202 may be hosted by and executed from network servers or services, and may be accessed through appropriate network applications programming interfaces (APIs). Others of the available applications 202 may be designed for execution on servers or processors of the control service 108. The installed server applications 136 may include those that are executed by the control service 108 as well as those that are hosted by third-party services under the supervision of the control service 108. Yet others of the available applications 202 may be designed for installation on and execution by the speech interface device 102. The installed device applications 124 include applications such as this.

As mentioned above with reference to FIG. 1, the control service 108 may have an automatic speech recognition (ASR) component 204 and a natural language understanding (NLU) component 206. The dialog management component 132 is configured to coordinate dialogs or interactions with the user 106 based on speech as recognized by the speech recognition component 204 and/or understood by the natural language understanding component 206. The control service 108 may also have a text-to-speech component 208 that is responsive to the dialog management component 132 to generate speech for playback to the user 106 on the speech interface device 102.

The components described above may function based on different types of models or rules. For example, the ASR component 204 may base its functionality on ASR models 210, which may include acoustic models created by means of various training techniques. Similarly, the NLU component 206 may utilize NLU models 212 that specify grammar, lexicons, phrases, responses, and so forth, and which also may be created by training. The dialog management component 132 may utilize dialog models 214 that specify logic for conducting dialogs with users. A dialog comprises an alternating sequence of natural language statements or utterances by the user 106 and system generated speech or textual responses. The dialog models 214 embody logic for creating responses based on received user statements in order to prompt the user 106 for more detailed information regarding intents or to obtain other information from the user 106.

The application selection component or intent router 138 identifies, selects, and/or invokes installed device applications 124 and/or installed server applications 136 in response to user intents identified by the NLU component 206. In response to a determined user intent, the intent router 138 attempts to identify one of the installed applications 124 and 136 that is capable of servicing the user intent. If such an application is found, it is called or invoked to either satisfy the user intent or to conduct further dialog with the user to further refine the user intent.

Each of the installed applications 124 and 136 may have or provide an intent specification that defines the intent that is serviceable by the application. The intent indicated by the intent specification may be referred to herein as an application intent or as the serviceable intent of the application. The intent specification of an installed application defines a general intent or intent type that can be serviced by the application. The control service 108 uses the intent specifications of the installed applications to detect user utterances, expressions, or intents that correspond to the applications 124 and 136.

An application intent specification may include NLU models for use by the natural language understanding component 206 in conjunction with the NLU models 212. In some cases, the NLU models 212 may include or incorporate the NLU models specified by the installed applications 124 and 136.

The installed applications 124 and 136 may also have or specify dialog models that create and coordinate speech interactions with the user 106. The dialog models may be used by the dialog management component 132 in conjunction with the dialog models 214 to create and coordinate dialogs with the user 106 and to determine user intent either before or during operation of the installed applications 124 and 136. In some cases, the dialog models 214 may include or incorporate the dialog models specified by the installed applications 124 and 136.

The control service 108 may have or expose an application programming interface and certain of the applications 124 and 136 may be registered through the API with the control service 108. The registration of a particular application may indicate or provide a corresponding intent specification for use by the control service 108. Application developers may provide registrations of their applications through the API so that the applications 124 and 136 may be used in conjunction with the control service 108.

The NLU component 206 and the dialog management component 132 may in some embodiments be configured to use the intent specifications of the applications 124 and 136 to conduct dialogs, to identify expressed intents of users, and to identify installed applications that correspond to or are capable of servicing intents expressed by users.

The intent specification of an application may be utilized either before or during operation of the application. In some cases, for example, the dialog management component 132 may utilize the intent specification when determining a general user intent, prior to initiating or invoking an application. More specifically, the NLU component 206 and dialog management component 132 may use the intent specification of an application in conjunction with the NLU models 212 and dialog models 214 to determine when a user has expressed an intent that can be serviced by the application. Subsequently, the NLU component 206 and dialog management component 132 may use the intent specification to conduct further dialogs with the user 106 in order to further refine the user intent. Alternatively, the application itself may conduct further dialogs with the user 106, utilizing capabilities of the control service 108, to refine user intent in order to provide associated functionality.

As an example, in response to a user utterance the control service 108 may refer to the intent specifications of multiple applications, including both device applications 124 and server applications 136, to identify a "purchase tickets" intent that has been registered as a serviceable intent by one of the applications. The service 108 may then invoke the corresponding application. Upon being invoked, the application may receive an indication of the determined intent and may conduct or coordinate further dialogs with the user 106 in order to elicit further intent details. Upon determining sufficient details regarding the user intent, the application may perform its designed functionality in fulfillment of the intent.

When conducting dialogs with the user 106, the installed applications may utilize speech-related capabilities of the control service 108 such as those of the ASR component 204, the NLU component 206, the dialog management component 132, and the text-to-speech component 208.

As another example, a user may state an intent that is not serviceable by any applications that are currently available to the user. For example, the user may state "I want to a call a taxi." Although none of the applications that the user has currently installed or activated are capable of servicing such an intent, the control service 108 may search a listing or marketplace of available applications 202 to identify one that has specified a matching or corresponding serviceable intent. In some cases, the control service 108 may then automatically install or enable the identified application. In other cases, the control service 108 may prompt the user to purchase or activate the application and subsequently launch or invoke the application. When installing one of the applications 202, the application may be installed on the speech interface device 102 or on the control service 108.

When an application has been invoked or initiated, further speech interactions with the user may be performed under the control of the initiated application, which may interpret user statements in accordance with the activity domain of the application, using NLU models that are particular to the application and its domain. For example, the application may conduct dialogs with the user in accordance with the functions that the application is designed to perform. Upon detecting a user statement or intent that is not consistent with the activity domain of the application, the application may terminate itself and control may return to the control service 108. In some cases, the control service 108 may continue to monitor user statements during execution of installed applications and may preempt an application upon detecting an expression or intent by the user that is not consistent with the activity domain of the application.

Figure 3:
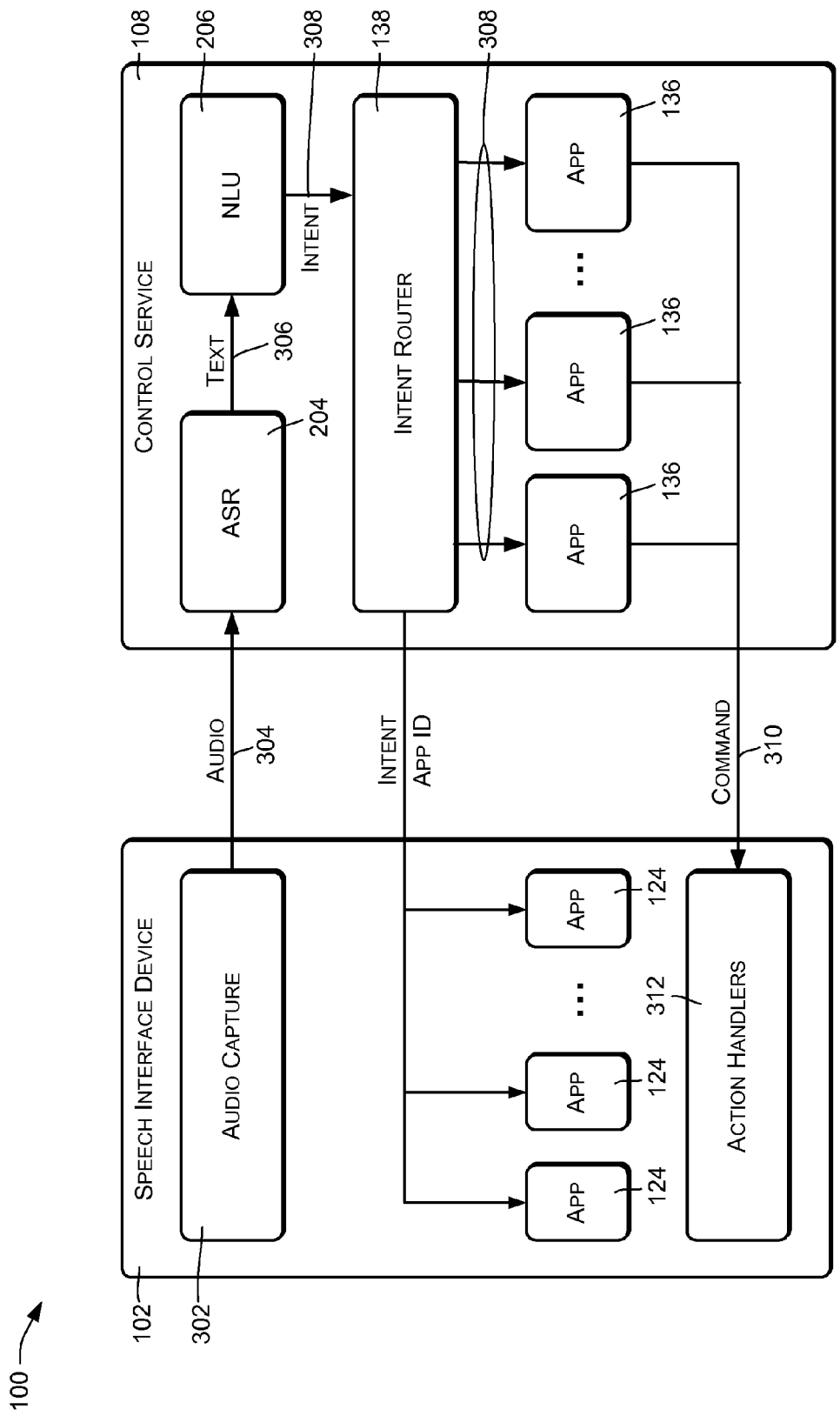
FIGS. 3 and 4 are block diagrams illustrating functional components used in selecting applications based on speech.

FIG. 3 illustrates logical components and functionality that may be implemented in the system 100 by the speech interface device 102 and the control service 108. The configuration illustrated by FIG. 3 allows an installable application to be located at and executed from either the speech interface device 102 or the control service 108. Note that although certain functionality is illustrated as being implemented by discrete components, such functionality may be implemented by different combinations of hardware and/or software within either or each of the speech interface device 102 and the control service 108.

The speech interface device 102 has an audio capture function or component 302 that captures audio from the environment 104 using the microphone 110. The audio capture component 302 generates an audio signal 304 and provides the audio signal 304 to the control service 108. The audio signal 304 potentially contains user utterances, including speech of the user 106.

The ASR component 204 receives the audio signal 304 and performs speech recognition to produce a text string 306 containing the natural language spoken by the user 106. The text string 306 is provided to the NLU component 206, which uses natural language understanding techniques to determine an intent 308 expressed by the words of the text string 306.

The control service 108 may have multiple installed server applications 136 as described above, which have been selected and enabled by a user for execution on one or more server computers of the control service 108. The speech interface device 102 may also have multiple installed device applications 124, which have been selected and enabled by a user for execution on the speech interface device 102. The installed applications 124 and 136 may perform different functions or provide different services relating to different activity or content domains. For example, one application might relate to the music domain and might have functionality for finding and playing music. Another application might correspond to a notification domain and might have functionality for setting and issuing alerts or alarms. The applications may be speech-enabled, meaning that they are configured to interact with users through speech to provide desired functionality. Each of the applications may correspond to one or more serviceable intents that the application is capable of satisfying or servicing.

The control service 108 may be configured to keep track of which server applications 136 have been installed or enabled for each of multiple speech interface devices 102. The control service 108 may also be configured to keep track of which device applications 124 have been installed and enabled on each of multiple speech interface devices 102. In addition the control service 108 may be configured to keep track of the intents that each installed or enabled application is capable of responding to or otherwise handling.

Upon recognizing an intent 308, the application selector or intent router 138 identifies and selects one of the device applications 124 or one of the server applications 136. The intent router 138 provides an indication or description of the recognized intent 308 to the selected application and invokes the selected application or causes invocation of the selected application. Invocation of the selected application may made programmatically and/or by appropriate API calls to the application or to the speech interface device 102.

When one of the applications 124 or 136 is selected, the selected application responds to the provided intent by performing a corresponding action. When one of the server applications 136 is selected, the action may be performed entirely by the application 136, or the application 136 may send a command 310 to an action handler 312 of the speech interface device 102 to cause the speech interface device 102 to perform the action or part of the action. For example, the application 136 may send a command for the speech interface device 102 to play a tone, to increase speaker volume, to play speech, or to perform some other action.

When one of the device applications 124 is selected, the intent router may send a command to the speech interface device 102, specifying the application that is to be invoked and the intent to which the application is to respond. The application may in some cases be specified by an application identifier (App ID). In response, the operating software 122 of the speech interface device 102 may programmatically invoke the specified device application 124. The selected device application may respond to the specified intent by using integrated capabilities of the speech interface device 102 and/or capabilities provided by the control service 108. For example, a selected and invoked device application 124 may utilize speech services of the control services 108, including ASR and NLU services, in order to conduct interactions and dialogs with the user 106. The selected device application 124 may also use or act in conjunction with other online services such as music services, news services, online merchants, various types of service providers, and so forth.

Figure 4:
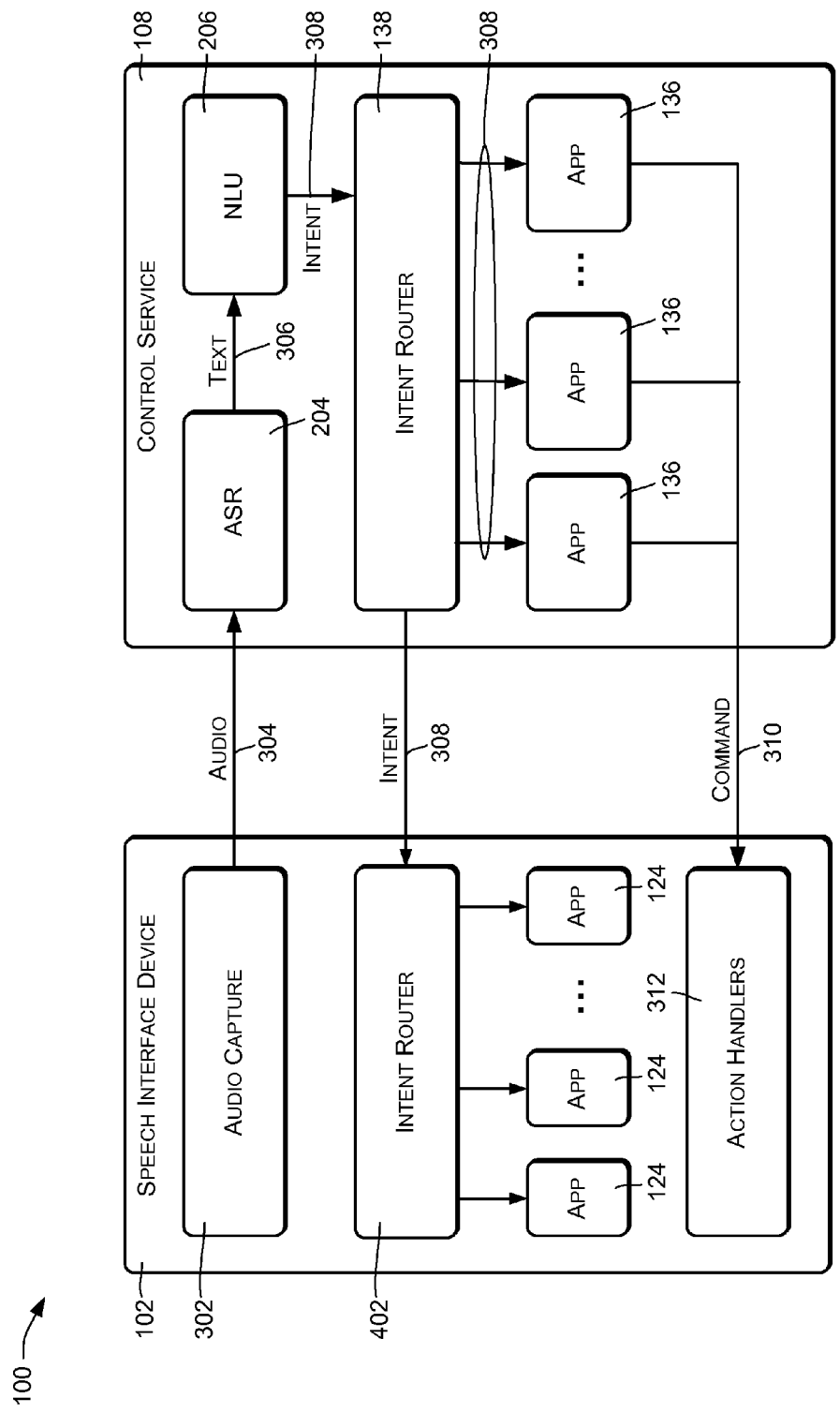

FIG. 4 illustrates an alternative configuration of components and functionality that may be implemented in the system 100 by the speech interface device 102 and the control service 108. The configuration illustrated by FIG. 4 is similar to the configuration illustrated by FIG. 3 except for the addition of an application selection component or intent router 402 as part of the speech interface device 102. In this example, the intent router 138 of the control service 108 does not select one of the device applications 124 in response to an intent. Rather, an indication of the intent 308 is passed to the intent router 402 of the speech interface device 102, and the intent router 402 selects an appropriate application based on the nature of the intent.

In this example, the intent router 138 of the control service 108 may first attempt to identify and invoke one of the server applications 136 that is suitable for responding to the determined intent 308. If such an application cannot be found, the intent 308 is passed to the intent router 402 of the speech interface device, which attempts to identify and invoke one of the device applications 124 that is capable of servicing the recognized intent. In some embodiments, the intent router 138 of the control service 108 may be configured to keep track of which device applications 124 are installed on the speech interface 102 and may pass the intent 308 to the speech interface device 102 only when one of the device applications 124 is able to respond to the intent.

Note that although certain techniques have been described in a speech-based context, user input and dialogs may be provided or conducted in ways other than speech, such as textually. For example, a user may specify intents by typing natural language statements using a keyboard, and a service may respond by displaying responsive text. Dialogs may be conducted using such two-way textual exchanges. In addition, an architecture other than described herein may be used other environments or configurations. For example, functions illustrated as being performed by the speech interface device may be performed by a computing device such as a personal computer, a smartphone, a tablet computer, or any other type of device.

A particular executable application may be designed for installation and execution on either the speech interface device 102 or the control service 108. Executing an application on the speech interface device 102 may be desirable in certain situations where the device may be able to provide more resources and/or lower latencies. In addition, applications installed on the speech interface device may be able to continue to provide certain functions such as local control functions during periods of network unavailability. Home automation is an example environment in which it may be desirable for applications to be installed on the speech interface device 102.

Executing an application on the control service 108 may be desirable in situations where the speech interface device 102 has limited capacities, for applications making heavy use of speech services, for functions primarily utilizing network resources, and/or in other situations.

In some situations, an application may be designed to execute on either one of the speech interface device 102 and the control service 108, or may be implemented as two similarly functioning versions suitable for execution on the respective entities. In these situations, a user may be asked to specify whether the application should be installed on the speech interface device 102 or the control service 108. Alternatively, the system 100 may evaluate other factors and may determine where to install the application. In some cases, an application may be installed on both the speech interface device 102 and the control service 108, and may execute from one location or the other depending on circumstances. Furthermore, in some situations there may be a different application installed on each of the speech interface device 102 and the control service 108 for handling the same intent, and the system 100 may determine which of the applications to invoke based on context or other factors.

Figure 5:
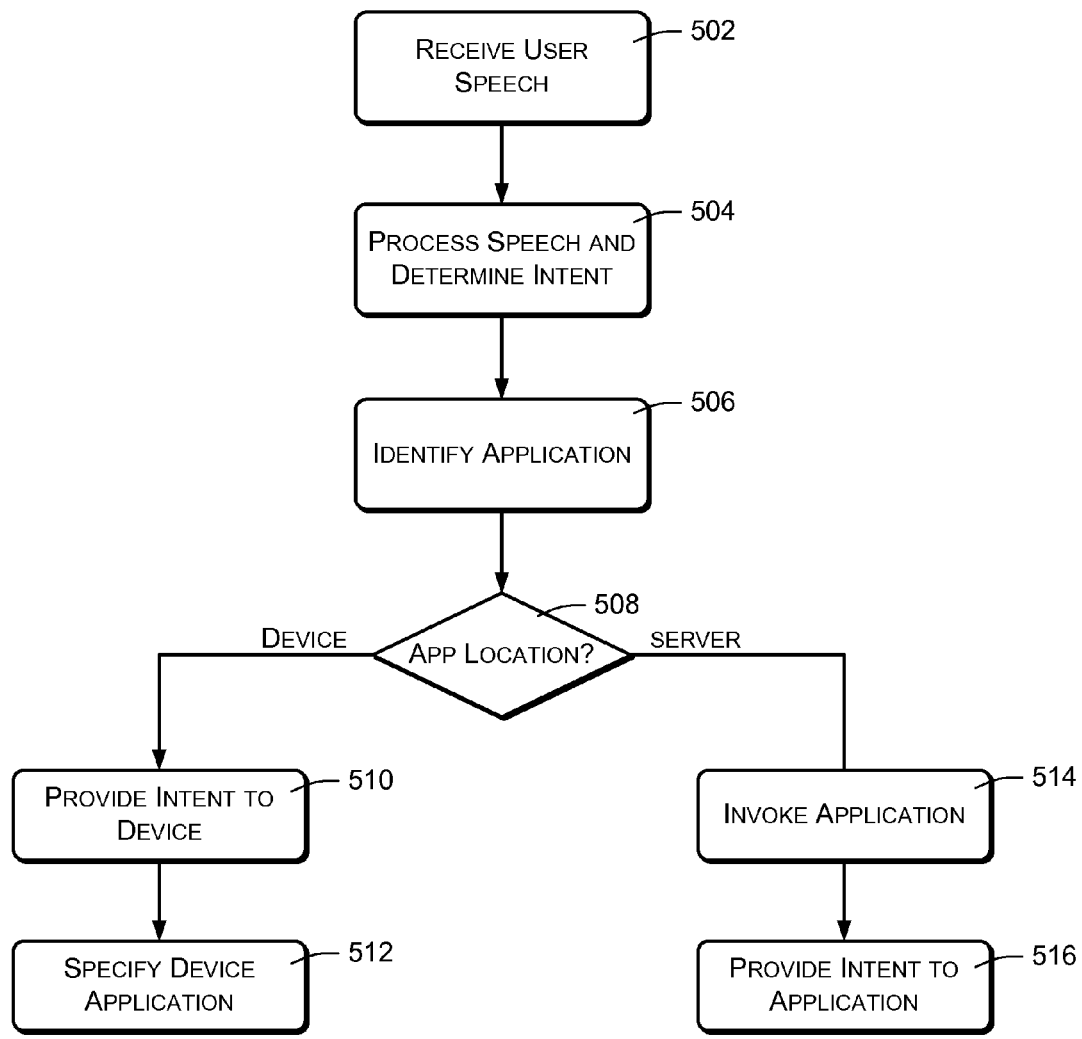
FIG. 5 is a flow diagram illustrating an example of actions that may be performed by a control service in described embodiments.

FIG. 5 illustrates an example method 500 of selecting and invoking user-installed applications in a speech-based or language-based system such as described above. In the described embodiment, the system includes a local speech interface device and one or more remote server computers configured to implement a control service. The user-installed applications may include server applications that have been selected and enabled by a user for execution on the one or more server computers to operate in conjunction with the speech interface device. The user-installed applications may also include device applications that have been selected and enabled by the user for execution on the speech interface device. Enabling an application may in some cases be performed by installing or directing the application to be installed in the device memory, computer server memory, or other memory that is associated with or accessible by the device or computer server. The term "user-installed" is used to indicate that an application has been expressly selected by a user of the system and enabled or installed for execution. The actions of FIG. 5 are described as being performed by the control service 108 of the system 100, although the method 500 may also be performed in other environments.

An action 502 comprises receiving user speech and/or a user utterance that indicates or expresses a corresponding user intent. The action 502 may comprise receiving audio from the speech interface device 102, which may contain the user speech. The speech interface device 102 may provide a continuous audio stream to the control service 108 or may provide audio segments containing individual user utterances.

An action 504 comprises performing speech processing on the received user speech to determine the intent expressed by the user speech. The action 504 may include performing automatic speech recognition (ASR) and natural language understanding (NLU) on the received user speech to determine the intent expressed by the user speech or utterance. The action 504 may also include performing a two-way speech dialog with the user to prompt the user for additional information and to thereby clarify elements or roles of the user intent.

An action 506 comprises identifying and/or selecting one of the server applications 136 or one or the device applications 124 corresponding to the intent expressed by the user utterance. The application may be selected by determining which of the applications has an associated serviceable intent that matches the expressed intent of the user.

Further actions depend on whether the identified and/or selected application is one of the device applications 124 or one of the server applications 136, as indicated by the decision block 508 of FIG. 5. If the identified application is one of the device applications 124, the control service 108 performs an action 510 of providing an indication of the intent to the speech interface device 102. The speech interface device 102 is responsive to the received indication of the intent to invoke one of the device applications 124 that performs an action corresponding to the intent. In some cases, the control service 108 may also perform an action 512 of explicitly specifying which of the device applications 124 is to be used to respond to the user intent, such as by specifically an application identifier. The speech interface device 102 responds to this specification by invoking the specified application 124, which in turn responds by performing an action corresponding to the user intent. In some cases, the invoked device application may also respond by confirming to the control service 108 or the intent router 138 that the device application has acted in response to the provided intent or that it is able to respond to the provided intent.

If the identified application is one of the server applications 136, an action 514 is performed of initiating or invoking the identified server application 136 and an action 516 is performed of providing an indication of the determined user intent to the invoked server application 136. The invoked application 136 may respond by performing an action corresponding to the user intent. In some cases, the invoked server application may also respond by confirming to the control service 108 or the intent router 138 that the server application has acted in response to the provided intent or that it is able to respond to the provided intent.

Note that in some embodiments, the intent router 138 may be configured to invoke both a device application 124 and a server application 136 in response to a particular intent, and to provide an indication of the intent to both of the two applications. Either one or both of the two invoked applications may provide a response indicating that they have or will perform an action in response to the first intent. When the intent router receives a response from one of the applications, the other application may be terminated or canceled, or instructed to cancel any further processing. For example, the device may provide a response that one of its applications will perform an action in response to the intent, and the intent router may in response cancel a server application that has previously been invoked to handle the intent. Alternatively, the server application may provide a response indicating that it will perform an action in response to the intent, and the intent router may in response instruct the device to cancel the device application. This technique may be used to reduce response latencies in some situations.

The method 500 may be performed iteratively to process successive user utterances and intents. For example, the control service 108 may receive successive first and second user utterances, corresponding to first and second user intents. In response to the first user intent, the control service 108 may identify, select, and cause a server application to be invoked, and may also provide an indication of the first user intent to the server application. In response to a second user intent, the control service 108 may identify, select, and cause to be invoked a device application and may provide an indication of the second user intent to the device and/or to the device application. Alternatively, in response to the second user intent, the control service 108 may simply pass an indication of the second user intent to the speech interface device, and the speech interface device may itself select and invoke an application from its user-installed device applications to respond to the second user intent.

In some implementations, the control service 108 may first attempt to determine whether one of the server applications is capable of responding to a particular user intent. If so, that server application is invoked to respond to the user intent. Otherwise, an indication of the user intent is provided to the speech interface device and the speech interface device identifies selects, and invokes one of its device applications to respond to the user intent.

Figure 6:
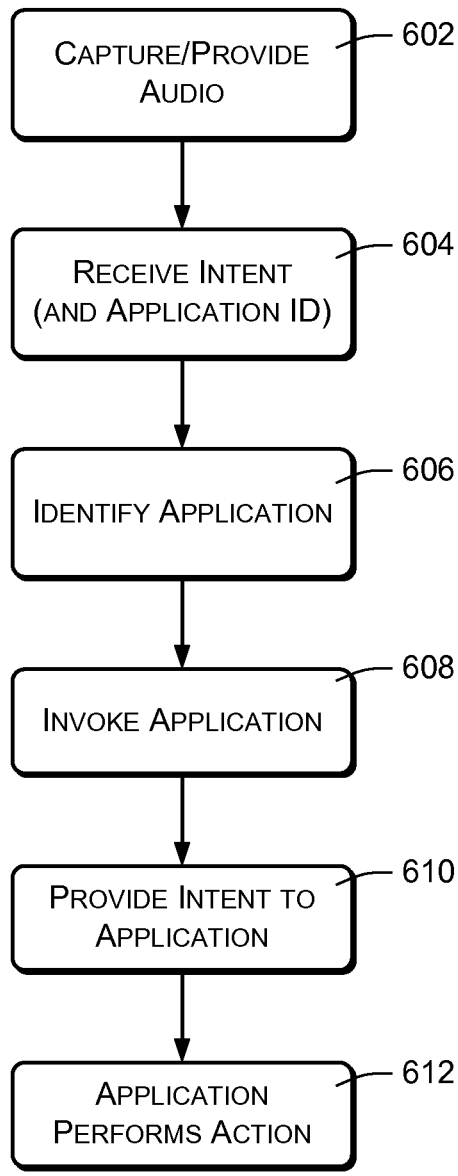
FIG. 6 is a flow diagram illustrating an example of actions that may be performed by a speech interface device in described embodiments.

FIG. 6 shows a method 600 that may be performed by the speech interface device 102 in conjunction with the method of FIG. 5. Although the method 600 is described with reference to the system described above, the method 600 may also be implemented in other environments and in conjunction with other types of devices.

An action 602 comprises capturing audio and providing the audio to the control service 108. The audio may contain user speech or utterances. An utterance contained by the audio may express or correspond to a user intent that can be serviced by an application that has previously been selected and enabled for execution by the speech interface device 102 or the control service 108.

An action 604 comprises, in response to providing user speech to the control service 108, receiving an indication of the intent that is expressed by the user speech. In some cases, the action 604 also comprises receiving a specification of a device application that is to be invoked in response to the user intent. The device application may be specified in terms of an application identifier (ID).

An action 606 comprises identifying an application corresponding to the user intent indicated by the action 604. In cases where the control service 108 has explicitly specified an application or an application ID, this may comprise simply identifying the application specified by the control service 108. In other cases, where the control service 108 has not specified a particular device application 124, the action 606 may comprise comparing the received intent with intents to which currently installed device applications are capable of responding, and selecting one of the device applications that is capable of responding to the intent indicated by the control service 108.

An action 608 comprises initiating or invoking the selected application. An action 610 may comprise providing the intent received from the control service 108 to the invoked application. An action 612, performed by the invoked application, comprises performing an act corresponding to the intent expressed by the user speech. In some cases, the application may conduct further dialogs with the user and may receive further speech in order to determine the act or acts that should be performed.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A system comprising:
   one or more server computers;
   one or more server applications that have been selected by a user for execution on the one or more server computers, wherein the one or more server applications operate in conjunction with a speech interface device located in premises of the user to provide services for the user;
   a speech processing component configured to receive, from the speech interface device, an audio signal that represents user speech, wherein the user speech expresses a user intent, the speech processing component being further configured to perform automatic speech recognition on the audio signal to identify the user speech and to perform natural language understanding on the user speech to determine the user intent; and
   an intent router configured to perform acts comprising:
      identifying a first server application of the one or more server applications corresponding to the user intent;
      providing a first indication to the first server application to invoke an action corresponding to the user intent;
      providing a second indication of the user intent to the speech interface device, wherein the speech interface device is responsive to the user intent to perform the action corresponding to the user intent;
      receiving, at the one or more server computers, a confirmation from the speech interface device that at least one of (i) the speech interface device will perform the action in response to the user intent or (ii) the speech interface device has performed the action in response to the user intent; and
      providing a third indication, based at least in part on receiving the confirmation, to the first server application to cancel responding to the user intent.

2. The system of claim 1, wherein:
   the speech interface device has one or more device applications that are selected by the user for execution on the speech interface device; and
   the speech interface device is configured to (a) identify a device application of the one or more device applications corresponding to the user intent and (b) invoke the device application to perform the action.

3. The system of claim 1, wherein:
   the speech interface device has one or more device applications that are selected by the user for execution on the speech interface device; and
   the acts further comprise (a) identifying a device application of the one or more device applications corresponding to the user intent and (b) causing the device application to be invoked to perform the action.

4. The system of claim 1, wherein:
   the user intent is a first user intent;
   the speech interface device has one or more device applications that are selected by the user for execution on the speech interface device; and
   the acts further comprise (a) determining that at least one of the one or more device applications corresponds to a second user intent and (b) providing a fourth indication of the second user intent to the speech interface device.

5. The system of claim 1, wherein:
   the speech interface device has one or more device applications that are selected by the user for execution on the speech interface device; and
   the one or more server applications and the one or more device applications are obtained from a collection of available applications in response to one or more user requests.

6. A method, comprising:
   under control of one or more computing systems configured with executable instructions,
      receiving a first selection to install a first application on one or more server computers;
      receiving a second selection to install a second application on a speech interface device;
      receiving an audio signal that represents user speech from the speech interface device, wherein the user speech indicates an intent;
      performing natural language understanding on the user speech to determine the intent;
      invoking the first application to respond to the intent;
      invoking the second application to respond to the intent;
      receiving a confirmation that at least one of (i) the first application will perform an action based at least in part on the intent or (ii) the first application has performed the action based at least in part on the intent; and
      providing a first indication, based at least in part on the receiving the confirmation, to the second application to cancel responding to the intent.

7. The method of claim 6, further comprising providing a second indication of the intent to the speech interface device, wherein the speech interface device is responsive to the second indication of the intent to perform the action corresponding to the intent.

8. The method of claim 6, further comprising providing a second indication of the intent to the speech interface device, wherein the speech interface device is responsive to the second indication of the intent to:
   identify the second application corresponding to the intent, wherein the second application has been selected by the user for execution on the speech interface device; and
   invoke the second application to perform the action corresponding to the intent.

9. The method of claim 6, further comprising:
identifying the second application corresponding to the intent, wherein the second application has been selected by the user for execution on the speech interface device; and
causing the second application to respond to the intent.

10. The method of claim 6, further comprising conducting natural language dialogs with the user to receive the user speech.

11. The method of claim 6, further comprising determining that the second application is available on the speech interface device for responding to the intent; and
providing a second indication of the intent to the speech interface device.

12. A processor-implemented method comprising:
receiving a first selection to install a first application on one or more server computers;
receiving a second selection to install a second application on a device;
receiving, from the device, an audio signal that represents user speech;
determining an intent corresponding to the user speech;
identifying the first application corresponding to the intent;
providing a first indication of the intent to the one or more server computers for invocation of the first application to respond to the intent;
providing a second indication of the intent to the device for invocation of the second application to respond to the intent;
receiving, at the one or more server computers, a confirmation from the device that at least one of (i) the device will perform an action in response to the intent or (ii) the device has performed the action in response to the intent; and
providing a third indication, based at least in part on receiving the confirmation, to the first application to cancel responding to the intent.

13. The processor-implemented method of claim 12, wherein the intent is a first intent, the processor-implemented method further comprising providing a fourth indication of a second intent to the device for invocation of a third application to respond to the second intent.

14. The processor-implemented method of claim 12, wherein the device comprises a speech interface located in a home of the user.

15. The processor-implemented method of claim 12, further comprising conducting natural language dialogs with the user through the device to determine the intent.

16. The processor-implemented method of claim 12, wherein the first application is configured to respond to the intent by sending one or more instructions to the device.

17. The processor-implemented method of claim 12, further comprising identifying the first application from multiple applications that have been selected by the user for execution on the one or more server computers.

18. The processor-implemented method of claim 12, wherein the intent is a first intent, the processor-implemented method further comprising:
receiving a third selection to install a third application on the device;
determining a second intent expressed by the user of the device;
providing a fourth indication of the second intent to the device; and
causing the device to invoke the third application to respond to the second intent.

19. The processor-implemented method of claim 12, wherein the intent is a first intent, and wherein the device is responsive to a fourth indication of a second intent to identify a third application from multiple applications that have been installed by the user for execution on the device.

20. The processor-implemented method of claim 12, further comprising determining that the second application is installed on the device for responding to the intent.

21. The processor-implemented method of claim 12, wherein the user speech is user speech, and wherein the intent is a first intent, the processor-implemented method further comprising:
determining that second user speech corresponds to a second intent;
determining that no server application for responding to the second intent has been selected by the user for execution on the one or more server computers; and
providing a fourth indication of the second intent to the device.

22. The method of claim 6, wherein the audio signal is a first audio signal, wherein the user speech is user speech, and wherein the intent is a first intent, the method further comprising:
receiving a second audio signal that represents second user speech from the speech interface device, wherein the second user speech indicates a second intent;
performing natural language understanding on the second audio signal to determine the second intent; and
providing a second indication of the second intent to the speech interface device.

23. The method of claim 22, further comprising determining that no application for responding to the second intent has been selected by the user for execution on the one or more server computers.

24. The processor-implemented method of claim 12, wherein the user speech is user speech, and wherein the intent is a first intent, the method further comprising:
receiving second user speech expressed by the user of the device;
determining a second intent expressed by the user of the device;
providing a fourth indication of the second intent to the device; and
causing the device to invoke a third application to respond to the second intent, wherein the third application has been selected by the user for execution on the device.

25. A processor-implemented method comprising:
receiving a first selection to install a first application on one or more server computers;
receiving a second selection to install a second application on a device;
receiving, from the device, an audio signal representing user speech;
determining an intent corresponding to the user speech;
identifying the first application corresponding to the intent;
providing a first indication of the intent to the one or more server computers for invocation of the first application to respond to the first intent;
providing a second indication of the intent to the device for invocation of a second application to respond to the first intent;
receiving a confirmation from the first application that at least one of (i) the first application will perform an action in response to the intent or (ii) the first application has performed the action in response to the intent; and providing a third indication, based at least in part on receiving the confirmation, to the device to cancel responding to the intent.

\* \* \* \* \*